United States Patent
Moss et al.

(10) Patent No.: US 10,458,227 B2
(45) Date of Patent: *Oct. 29, 2019

(54) WELL COMPLETION WITH SINGLE WIRE GUIDANCE SYSTEM

(71) Applicant: Applied Technologies Associates, Inc., Paso Robles, CA (US)

(72) Inventors: Clinton Moss, Edmonton (CA); Douglas Ridgway, Edmonton (CA); Troy Martin, Edmonton (CA)

(73) Assignee: APPLIED TECHNOLOGIES ASSOCIATES, INC., Paso Robles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,138

(22) Filed: Jul. 6, 2018

(65) Prior Publication Data

US 2018/0313202 A1  Nov. 1, 2018

Related U.S. Application Data

(62) Division of application No. 14/869,439, filed on Sep. 29, 2015, now Pat. No. 10,041,345.

(Continued)

(51) Int. Cl.
   *E21B 47/022* (2012.01)
   *G01V 3/08* (2006.01)
   (Continued)

(52) U.S. Cl.
   CPC .... *E21B 47/02216* (2013.01); *E21B 43/2406* (2013.01); *G01B 7/14* (2013.01); *G01V 3/081* (2013.01); *G01V 3/26* (2013.01)

(58) Field of Classification Search
   CPC ............ E21B 47/022; E21B 47/02216; G01V 2200/16; G01V 3/26
   See application file for complete search history.

(56) References Cited

U.S. PATENT DOCUMENTS 4,691,203 A * 9/1987 Rubin ................... E21B 47/122
                                                        324/369
4,821,035 A * 4/1989 Hanson ................. E21B 47/121
                                                         166/65.1
(Continued)

FOREIGN PATENT DOCUMENTS

RU          2298095 C1       4/2007

OTHER PUBLICATIONS

Office Action issued in Russian Application No. 2017113705/03, dated Mar. 1, 2019 and English translation thereof (12 pages).

*Primary Examiner* — Walter L Lindsay, Jr.
*Assistant Examiner* — Milton Gonzalez
(74) *Attorney, Agent, or Firm* — Adolph Locklar

(57) ABSTRACT

A system for guiding a well comprises a current source, a ground terminal electrically connected to the current source and grounded at the surface of the Earth, a reference wellbore comprising an intermediate casing (IC) that includes an IC electrical discontinuity and is electrically conductive between that the IC discontinuity and the IC bottom hole, a reference conductor electrically connected to the current source, a tubular that includes a tubular string electrical discontinuity (TSED), is electrically conductive between the TSED and the tubular bottom hole end (TBHE), and is inserted into the reference wellbore through the IC. Electrical connections exist between the tubular, the reference conductor, and the reference wellbore between the TSED and the TBHE, whereby current flowing through the reference conductor produces a magnetic field; magnetic sensors to sense the magnetic field and a guided wellbore is steered in response to the sensed magnetic field.

18 Claims, 7 Drawing Sheets

Related U.S. Application Data

(60) Provisional application No. 62/058,369, filed on Oct. 1, 2014.

(51) Int. Cl.
  *G01B 7/14* (2006.01)
  *E21B 43/24* (2006.01)
  *G01V 3/26* (2006.01)

(56) References Cited

U.S. PATENT DOCUMENTS

| | | |
|---|---|---|
| 5,074,365 A | 12/1991 | Kuckes |
| 5,515,931 A | 5/1996 | Kuckes |
| 5,676,212 A | 10/1997 | Kuckes |
| 2004/0046558 A1 | 3/2004 | Matsumoto |
| 2006/0124360 A1 | 6/2006 | Lee et al. |
| 2009/0321071 A1 | 12/2009 | Zhang et al. |
| 2012/0139748 A1 | 6/2012 | Hay et al. |

* cited by examiner

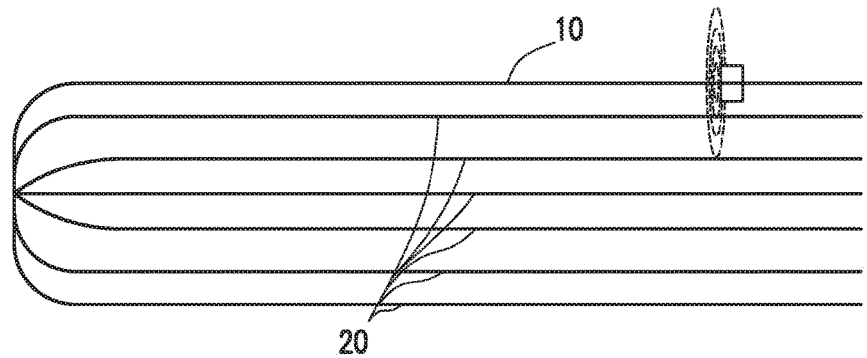
FIG. 8
FIG. 9
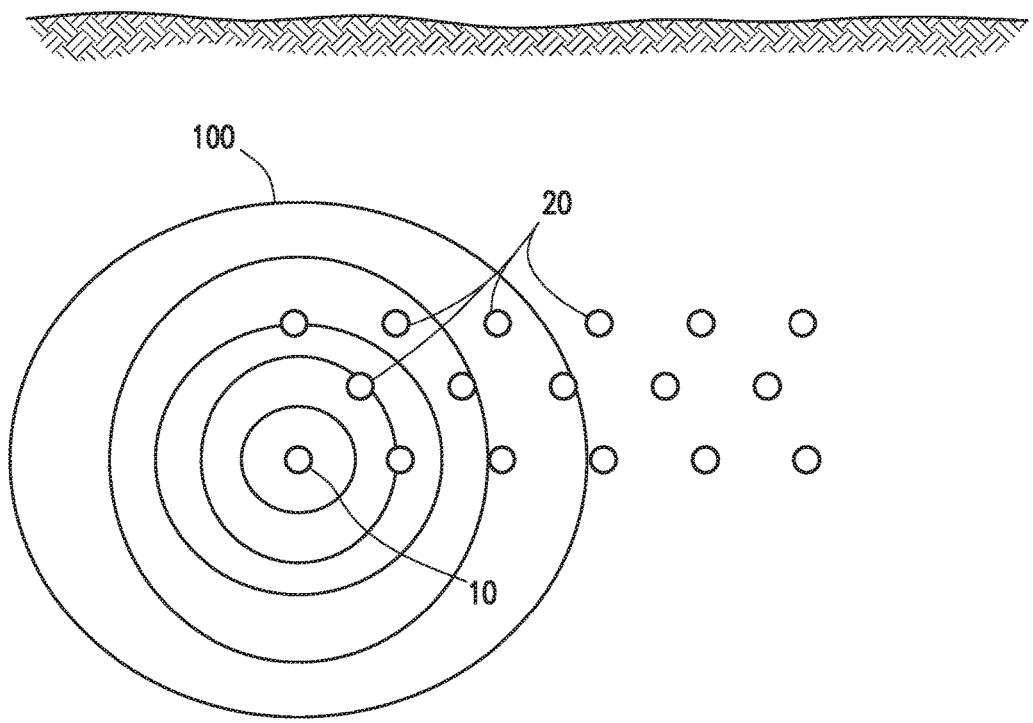

WELL COMPLETION WITH SINGLE WIRE GUIDANCE SYSTEM

CROSS-REFERENCE TO RELATED APPLICATIONS

The present application is a Divisional application of U.S. Nonprovisional Patent Application No. 14/869,439, filed Sep. 29, 2015 that claims priority from U.S. Provisional Patent Application No. 62/058,369, filed on Oct. 1, 2014, the entirety of each of which is incorporated herein by reference.

TECHNICAL FIELD/FIELD OF THE DISCLOSURE

The present disclosure relates generally to borehole location systems, and specifically to use of magnetic fields for determination of position of a subsurface wellbore.

BACKGROUND OF THE DISCLOSURE

Accurate wellbore placement and surveying may be important for the development of subsurface oil & gas deposits. Directional drilling while sensing position and direction of drilling of the drill bit is known as measurement-while-drilling ("MWD"). Certain MWD systems use measurements of the Earth's gravitational and/or magnetic fields and may use gyroscopic measurement of rotational motion while drilling. These MWD tools may calculate well paths using inertial guidance. Such inertial guidance methods may allow the accumulation of error along the well path creating increasing uncertainties of position as the well is drilled.

Certain other methods allow for direct downhole determination of position in a borehole, which may result in the reduction of the uncertainty of the well path. One such method is active ranging, which uses the generation and measurement of magnetic fields. For instance, in certain traditional methods, a magnetic coil is placed downhole in a reference well. The magnetic coil is energized from the surface through a wireline to form a dipole magnetic field. The wireline, in addition to providing power, may also suspend and place the magnetic coil. The generated dipole magnetic field is measured by a triaxial magnetometer in another well being drilled, allowing the position of the drill bit to be determined relative to the reference well. Such traditional methods have been used for steam assisted gravity drainage (SAGD) extraction of heavy oil. Certain SAGD operations use two parallel wellbores, one above the other relative to the surface of the earth. These traditional coil systems methods may be limited in range and may require the use of wireline trucks to place and power the coil.

Certain SAGD operations have used single wire guidance methods. Single wire guidance systems use a magnetic field generated around a single current carrying wire. This wire may be placed on the surface or in a reference borehole, as described in U.S. Pat. No. 4,593,770, which is incorporated herein by reference. Because the magnetic field surrounding the linear wire of the single wire guidance method decays as $1/r$, rather than the $1/r^3$ for the field surrounding a dipole, ranging at greater distances than with downhole coil active ranging is possible with single wire guidance.

In borehole single wire guidance systems, the reference well magnetic field may be dissipated because of a cancelling return current along the cased wellbore. Electrical isolation elements may be installed between adjacent casings to limit the return current through the pipe. In theory, nearly 100% of the current supplied down the wireline may be delivered to an insulated electrode section of casing in the casing string. The current may then enter the formation, and propagate through paths in the formation to a ground return rod on the current source. While this method may provide a strong signal and good ranging, like active coil ranging, single wire guidance may require wireline access to a well bore to place the single wire.

SUMMARY

The present disclosure includes a system. The system includes a current source and a ground terminal. The ground terminal is electrically connected to the current source. The ground terminal is grounded at the surface of the Earth. The system further includes a reference conductor. The reference conductor is electrically connected to the current source, and the reference conductor is inserted into a reference wellbore. The system further includes a tubular. The tubular includes a tubular string electrical discontinuity, and the tubular is inserted into the reference wellbore. The tubular has a tubular bottom hole end, and the tubular is electrically conductive between the electrical discontinuity and the bottom hole end. The system further includes an electrical connection between the tubular and reference conductor between the tubular string electrical discontinuity and the tubular bottom hole end. The system also includes an electrical connection between the tubular and the reference wellbore between the tubular string electrical discontinuity and the tubular bottom hole end. The system further includes magnetic sensors located outside the reference wellbore.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 8 is a top view of the use of a single wire guidance system with multiple adjacent horizontal well legs horizontally spaced to one another consistent with at least one embodiment of the present disclosure.

FIG. 9 is a vertical cross section of the use of a single wire guidance system in an array of horizontal wells displaced vertically and laterally from a reference well bore consistent with at least one embodiment of the present disclosure.

DETAILED DESCRIPTION

Figure 1:
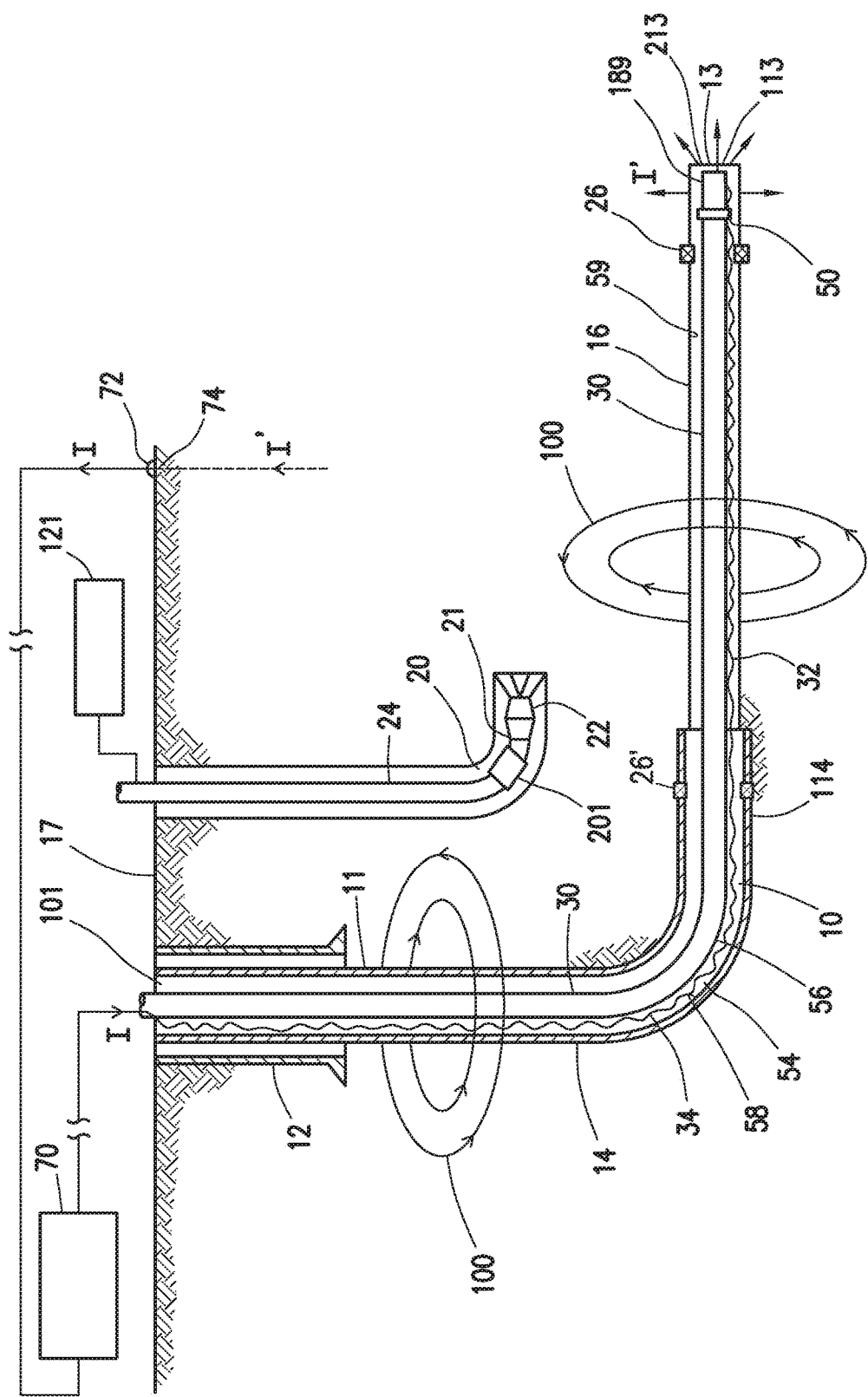
FIG. 1 a schematic representation of a single wire guidance system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure may relate in certain embodiments to a borehole location system for guiding a drilling wellbore with respect to an existing reference wellbore, and to locate the relative position of a subsurface wellbore via acquisition of electromagnetic data. A reference conductor may be deployed in an annular space between concentric tubulars, or within completion tubulars. The reference conductor may be conveyed to a downhole location at a desired depth when the completion tubulars are installed in the well. The reference conductor may be insulated and, in some embodiments, be grounded to the Earth at or near the bottom hole location, or another subsurface location that has been selected for a particular application. The reference conductor may be conducted to a wellhead through a gland in the wellhead. The well may be produced or otherwise operated while the reference conductor is energized. A reference current may be applied to the reference conductor, and the reference current subsequently injected into the surrounding formation at point which is beyond or deeper than the electrical discontinuity, if present. The magnitude of the current injected into the formation may be adjusted, and the waveform of the current modulated to facilitate advanced signal processing techniques. The current applied to the reference conductor may have associated with it a magnetic field ranging signal that can be detected by at least one surface or subsurface sensor. A relative bearing and distance between the reference conductor and the sensor(s) may then be determined by downhole or surface data processing.

As shown schematically in FIG. 1, in certain embodiments of the present disclosure, reference wellbore (10) includes surface casing (12). Surface casing (12) may extend vertically from surface (17) along a portion of outer borehole surface (11), typically between 10 and 50 meters or approximately 30 meters from surface (17). Reference borehole (10) may further include intermediate casing (14). Intermediate casing (14) may extend from surface (17) into a horizontal portion (114) of reference wellbore (10). Reference wellbore (10) may further include liner (16). Liner (16) may be connected to or "hung" from intermediate casing (14). Liner (16) may extend to bottom hole end (13) of reference wellbore (10). Liner (16) and intermediate casing (14) may be electrically connected.

In certain embodiments, reference wellbore (10) may be a producer well. In other embodiments, reference wellbore is not a producer well. The well to which reference wellbore (10) is measured, such as by a well being drilled, is, for example, as shown in FIG. 1, guided wellbore (20). In certain non-limiting embodiments, such as the embodiment depicted in FIG. 1, guided wellbore (20) may be drilled along a path substantially parallel to reference wellbore (10). In other embodiments, guided wellbore (20) is not substantially parallel to reference wellbore (10) and may be perpendicular to reference wellbore (10). In yet other embodiments, guided wellbore (20) may not be included. "Substantially" parallel means that the guided wellbore (20) and the reference wellbore (10) have one or more sections wherein there is less than a ten degree difference between the borehole axis of reference wellbore (10) and guided wellbore (20). Non-limiting examples of the distance between reference wellbore (10) and guided wellbore (20) include between 5 and 10 meters apart, although one of ordinary skill in the art with the benefit of this disclosure will recognized that greater or lesser distances between wellbore (10) and guided wellbore (20) are encompassed within the scope of this disclosure.

Guided wellbore (20) may be drilled with drill head (22) having a rotary bit at lower end (21) of guided wellbore drill string (24). Drill head (22) may be operated from equipment located at the surface (not shown). Guided wellbore (20) may include magnetic field sensors (201) capable of detecting the direction and magnitude of magnetic fields. In certain embodiments, the magnetic field sensors are magnetometers; non-limiting examples of magnetometers are fluxgate magnetometers. In some embodiments, magnetic field sensors (201) are adapted to measure the x, y, and z vectors of a magnetic field, such as magnetic field (100). In certain embodiments, drill head (22) may be steerable to control the direction of drilling, and magnetic field sensors may be included with measurement-while-drilling (MWD) instrumentation. The MWD instrumentation may also include accelerometers for measuring the Earth's gravitational field and gyroscopes for measuring the rotational position of the instrumentation within guided wellbore (20).

Intermediate casing (14) of reference wellbore (10) may be formed from electrically conductive steel casing string incorporating a multiplicity of steel casing sections. Steel casing sections may each be about 10 meters long and connected end-to-end by threaded joints. Intermediate casing (14) may be electrically conductive, such as when formed by steel casing. In an embodiment, intermediate casing (14) may include electrical discontinuity (26') at or near bottom hole end (13). In other embodiments, the location of electrical discontinuity (26') is non-limiting and may be located anywhere along intermediate casing (14). In still other embodiments, as shown in FIG. 1, electrical discontinuity (26) may be located within liner (16). Liner (16) may be electrically conductive. Electrical discontinuity (26) may be a gap sub, a non-conductive joint made of a non-conductive material such as fiberglass, PEEK, or polyethylene, a section of non-conductive casing or piping, made, for instance, from fiberglass, or formed by coating the threads between casing lengths with a non-conductive substance. As one of ordinary skill in the art will appreciate in light of the present specification, the "non-conductive" may be "substantially non-conductive" in that under certain circumstances, small amounts of current could be made to flow through the "non-conductive" material. Electrical discontinuity (26) may break the electrical continuity of intermediate casing (14) or liner (16).

In other embodiments, intermediate casing (14) or liner (16) may be formed, in part, by non-conductive material, such as fiberglass. In such embodiments, the portion of intermediate casing (14) or liner (16) that is formed from the non-conductive material acts as electrical discontinuity (26). When intermediate casing (14) or liner (16) is formed in part from an non-conductive material, a section of conductive material, such as steel, is used from grounded end (66) to liner/casing bottom hole end (113).

Reference wellbore (10) may further include a tubular, such as completion string (30). Completion string (30) may be, for instance, as shown in FIG. 1 a production string. Completion string (30) may be composed of jointed or coiled tubing. Completion string (30) may be inserted into intermediate casing (14) and may terminate at tubular bottom hole end (213). Completion string (30) may include tubular string electrical discontinuity (50) near tubular bottom hole end (213). The distance between tubular string electrical discontinuity (50) may be based on the surface area of the outside diameter of completion string (30) between tubular string electrical discontinuity (50) and tubular bottom hole end (213). The desired surface area may be selected based on, for instance, formation resistivity and the effect thereon current injection. In certain embodiments, the distance between tubular string electrical discontinuity (50) and tubular bottom hole end (213) may be about one joint of casing or about 30 feet. In other embodiments, the location of completion string electrical discontinuity is not limited and may be placed anywhere along completion string (30). Tubular electrical discontinuity (50) may be a gap sub, non-conductive joint, or a non-conductive coating between joints of tubing.

In other embodiments, completion string (30) may be formed, in part, by non-conductive material, such as fiberglass. In such embodiments, the portion of completion string (30) that is formed from the non-conductive material acts as electrical discontinuity (50). When completion string (30) is formed in part from an non-conductive material, a section of conductive material, such as steel, is used from grounded end (66) to tubular bottom hole end (213).

With further reference to FIG. 1, at surface (17), reference conductor (32) is attached to current source (70). Current source (70) may be in some embodiments a reversible DC source, or an AC source, adapted to supply direct or alternating current to reference conductor (32). Current source (70) is connected to ground terminal (72) which is grounded to ground point (74) at surface (17). In certain embodiments, ground point (74) may be spaced from well head (101) by greater than 100 feet, greater than 1500 feet, or between 1500 and 3000 feet. In some instances, placement of ground point (74) may depend on the placement of a convenient ground point relative to reference wellbore (10). In an embodiment, current source (70) may be a source of reversible direct current. The amperage of current flow I when current source (70) is reversible direct current may range from 1-1000 amperes, 5-10 amperes, or 10 to 100 amperes. Maximum amperage may depend on the gauge of wire used to conduct current flow I; in certain circumstances, the gauge of wire available for downhole use may depend on the space available for the wire itself. When current source is reversible direct current, current (I) flows first in one direction for a period of time and then is reversed to flow in the opposite direction for a second period of time during measurements of the magnetic field (100). Alternatively, alternating current may be used in place of reversible direct current for current source (70). The Frequency selected for the alternating current may depend in part on frequencies and resonant frequencies of alternating current sources already present on rigs and other equipment associated with reference wellbore (10) and guided wellbore (20). It may be desirable to avoid the frequencies and resonant frequencies already present to reduce noise of measurements described herein. In an embodiment, a frequency of between one and five Hz may be used for the alternating current from current source (70). In some circumstances, higher frequencies may be used when a higher measurement sampling rate is desired. In certain embodiments, when current source (70) is an AC source, signal filtering and amplification may be employed, which may permit a greater effective detection range.

Current source (70) may supply current (I) to reference conductor (32), which flows along reference conductor (32) to bottom hole end (13). Reference conductor (32) is electrically connected to terminal end (189) of completion string (30), which is in contact with end segment of liner (16). Reference conductor (32) is electrically coupled to completion string (30) below electrical discontinuities (26), (50). The current I is thus injected into the Earth, as indicated by the arrows I'. In certain embodiments, current I' may not travel up liner (16), intermediate casing (14), or completion string (30) because of the electrical discontinuities (26), (50), but propagates into the surrounding formation and to current source (70) by way of ground terminal (72).

As a result of the foregoing connections, the dominant current in reference wellbore (10) is current I flowing through reference conductor (32). Such a current produces magnetic field (100) surrounding and coaxial with reference conductor (32), and in a plane perpendicular to axis of reference wellbore (10). Magnetic field (100) extends outwardly from reference wellbore (10) and provides a ranging signal which may be sensed by magnetic sensors (201) in guided wellbore (20) or surface (17). The magnitude and direction of magnetic field (100) may, in certain embodiments, be measured and transmitted to surface (17) where computer (121) may perform a positioning calculation to determine the distance and direction from magnetic sensors (201) to reference wellbore (10). In some embodiments, the positioning calculation may be accomplished downhole with an onboard processor contained in the MWD drill string.

As further shown in FIG. 1, reference conductor (32), which may be included in sensor bundle (34), in certain completion wells may pass through a wellhead gland (not shown) and continue into reference wellbore (10) in annular space (54) between intermediate casing (14) and completion string (30). Sensor bundle (34) may be insulated. Reference conductor (32) or sensor bundle (34) may be attached to outside diameter (56) of completion string (30), or intermediate casing inside diameter (58) of intermediate casing (14) and liner inside diameter (59) of liner (16).

Figure 2:
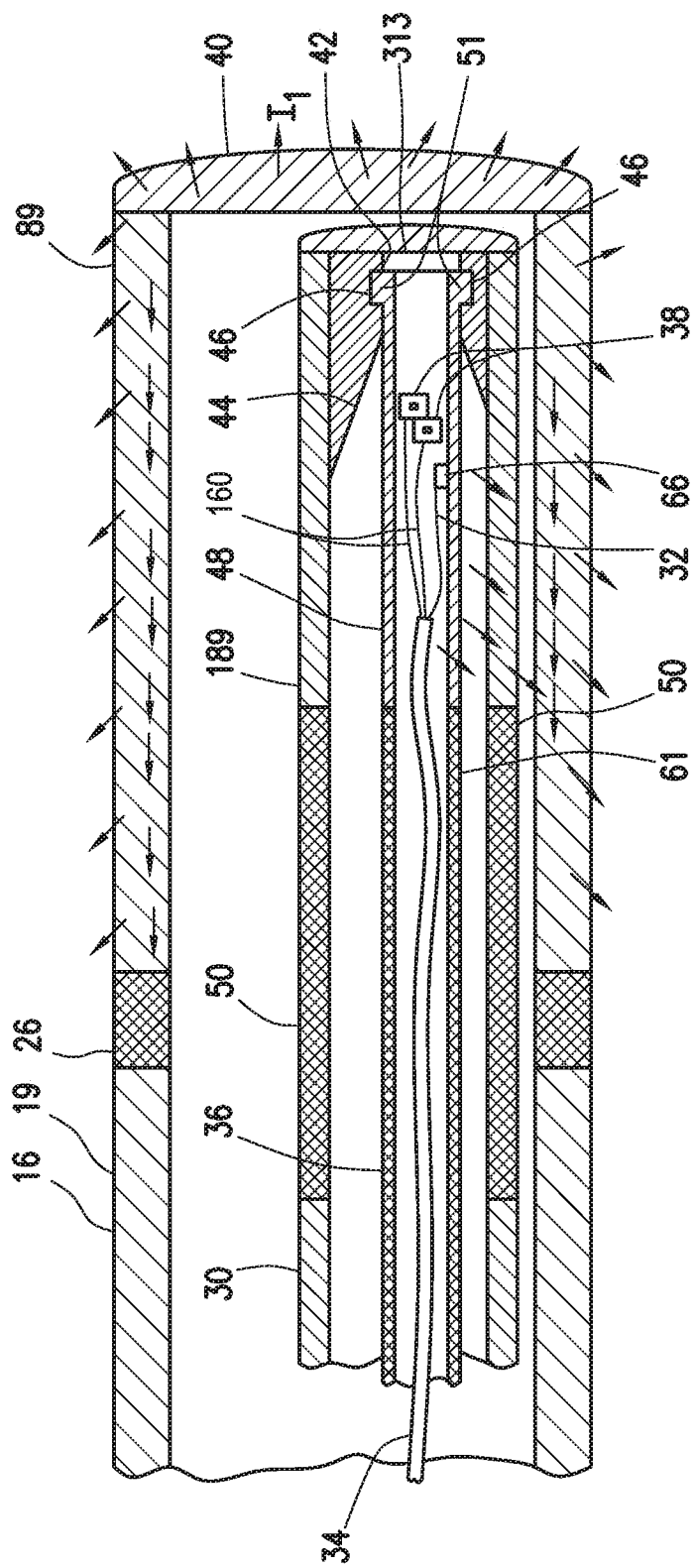
FIG. 2 is an expanded schematic view of a terminal joint of a single wire guidance system consistent with at least one embodiment of the present disclosure.

Alternatively, as shown in FIG. 2, reference conductor (32) or sensor bundle (34) may be contained within another tubing string (36), such as a coiled tubing; tubing string (36) may be located within completion string (30). Reference conductor (32) may be composed of an insulated cable having an interior electrical conductor. In the embodiment depicted in FIG. 2, sensor bundle (34) may also include wire connectors (160) to downhole sensors (38). In certain embodiments, each of the wires within sensor bundle (34) is insulated from one another. Also in certain embodiments, wire connectors (160) may be insulated. Downhole sensors (38) may be, for instance, temperature and/or pressure sensors. In other embodiments, reference conductor (32) may be the only wire deployed in reference wellbore (10).

Grounded end (66) of reference conductor (32) is grounded to the Earth below or beyond tubular string electrical discontinuity (50) and electrical discontinuity (26). In the embodiment shown in FIG. 2, grounded end (66) of reference conductor (32) is grounded at or near tubing string bottom hole end (313) of tubing string (36). Grounded end (66) may be connected to tubing string (36) by, for example, a set screw or other method.

Figure 3:
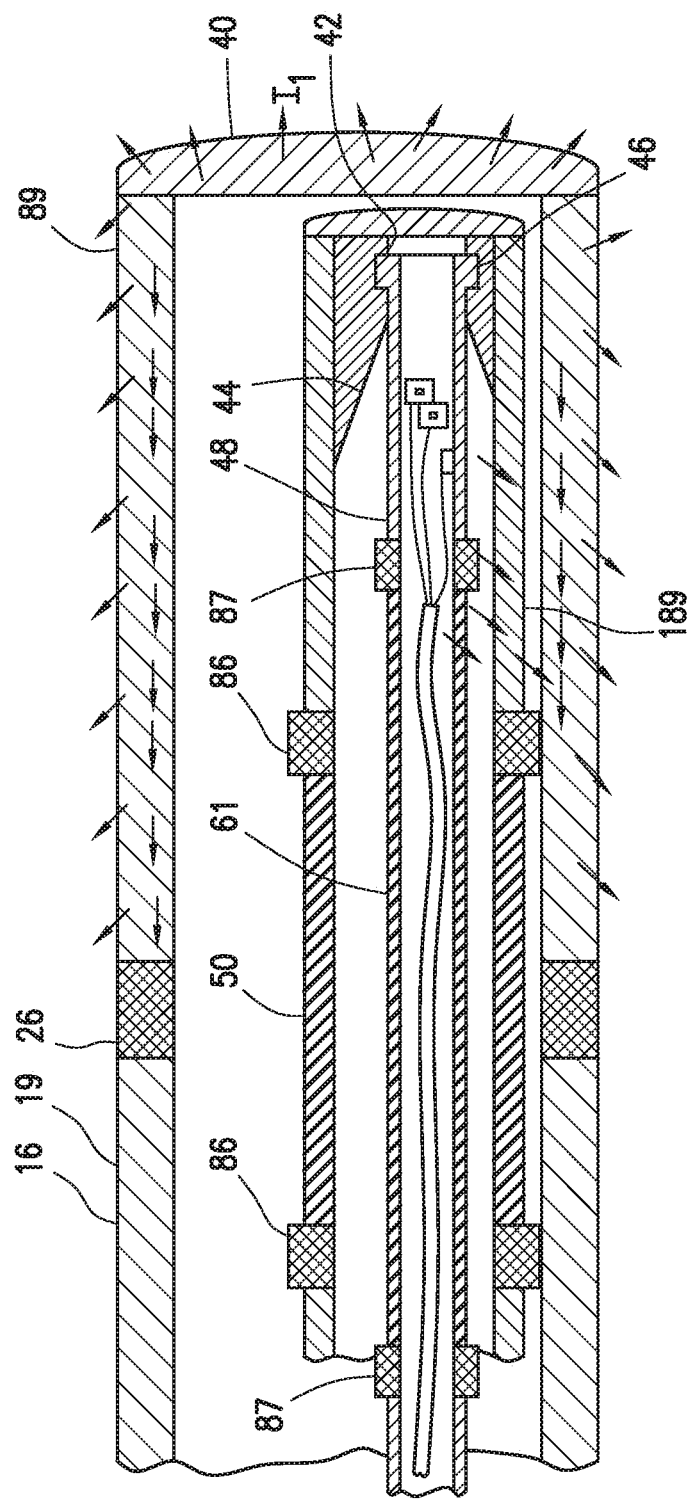
FIG. 3 is an expanded schematic view of a terminal joint of a single wire guidance system consistent with at least one embodiment of the present disclosure.

In the embodiments depicted in FIGS. 2 & 3, liner (16) ends in a liner bullnose (40). Completion string (30) may be formed of tubing, such as 2⅜" tubing and may terminate in landing bullnose (42) having landing ramp (44) and slots (46). As shown in FIGS. 2 and 3, tubing string (36), which includes the reference conductor (32) may be within completion string (30). In the embodiments depicted in FIGS. 2 & 3, reference conductor (32) is electrically connected to a portion of tubing string (36) below tubing string non-conductive section (61), i.e., terminal joint (48). Terminal joint (48) electrically connects reference conductor (32) to completion string (30). As shown in FIGS. 2 and 3, in either one of or both completion string (30) and tubing string (36), tubular string discontinuity (50) and/or tubing string non-conductive section (61), respectively, may isolate terminal joint (48) from tubing string (36).

Terminal joint (48) may have colleted landing fingers (51). Colleted landing fingers (51) may be inserted into slots (46) to hold terminal joint (48) to landing ramp (44). One of ordinary skill in the art with the benefit of this disclosure will recognize that other methods of connecting terminal joint (48) with landing ramp (44) and this disclosure is not limited to method depicted in FIGS. 2 & 3. The mechanism of landing terminal joint (48) may include means for removing terminal joint (48), such as by including a weak point, which may disengage or break with a pulling force (not shown).

Tubular string discontinuity (50) and tubing string non-conductive section (61) may be made from a non-conductive material, for instance, fiberglass or polyether ether ketone (PEEK), or may be coated with a non-conductive substance such as a non-conductive polymer. Alternatively, as shown in FIG. 3, one or more production string stand-off gaps subs (86) and/or tubing string stand-off gap subs (87) may be employed to further provide electrical isolation of terminal joint (48) from tubing string (36). Production string stand-off subs (86) may have a greater outer diameter than that of completion string (30). Similarly, tubing string stand-off gap subs (87) may have a greater outer diameter than that of tubing string (36).

As shown in FIGS. 2 & 3, electrical contact will result from physical contact between terminal joint (48) on both completion string (30) and tubing string (36), and to end segment (89) of liner (16), which in one embodiment, is also electrically isolated from the upper liner segment (19) by electrical discontinuity (26). In an alternative embodiment, conductive contact elements (not shown) may be provided within the annular space between an outer tubular and an inner tubular, such as between liner (16) or intermediate casing (14) and completion string (30), to ensure conductivity with the terminal joint. An example of a conductive contact element may be, for instance, a blow spring centralizer.

Figure 4:
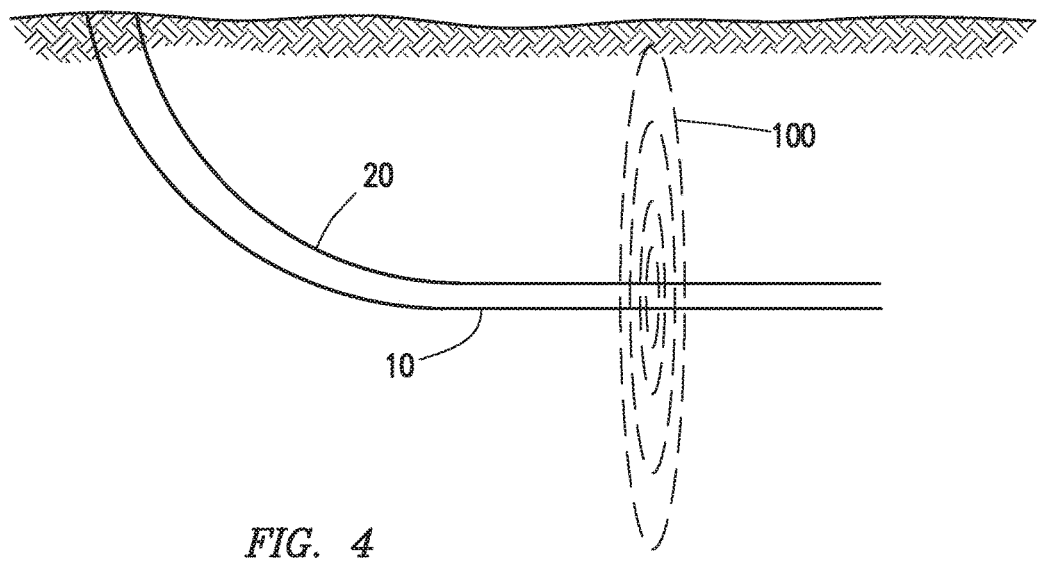
FIG. 4 is a side view depicting the use of a single wire guidance system in a twin SAGD well consistent with at least one embodiment of the present disclosure.

The methodology illustrated above may be used for drilling boreholes in SAGD extraction, as shown schematically in FIG. 4. FIG. 4 depicts a twin SAGD well. In a twin SAGD well, it may be desirable to drill guided wellbore (20) generally parallel to reference wellbore (10). An MWD tool or wireline tool is in guided wellbore (20). The range between the guided wellbore (20) and the reference wellbore may be determined as described above.

Figure 5:
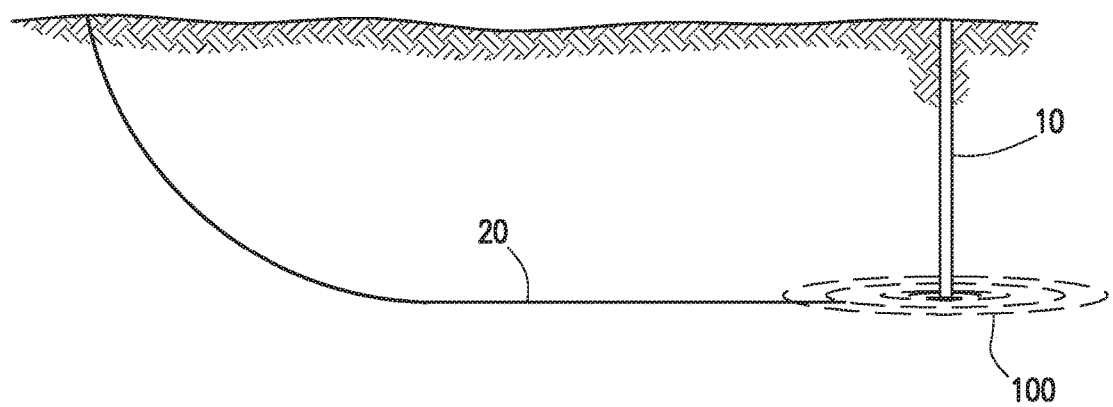
FIG. 5 is a side view depicting the use of a single wire guidance system in a horizontal/vertical well combination consistent with at least one embodiment of the present disclosure.

The methodology illustrated above may further apply to a vertical reference wellbore (10) and a horizontal guided wellbore (20) as shown schematically in FIG. 5. The ranging method described above may be used as guided wellbore (20) is drilled towards the vertical reference wellbore (10).

Figure 6:
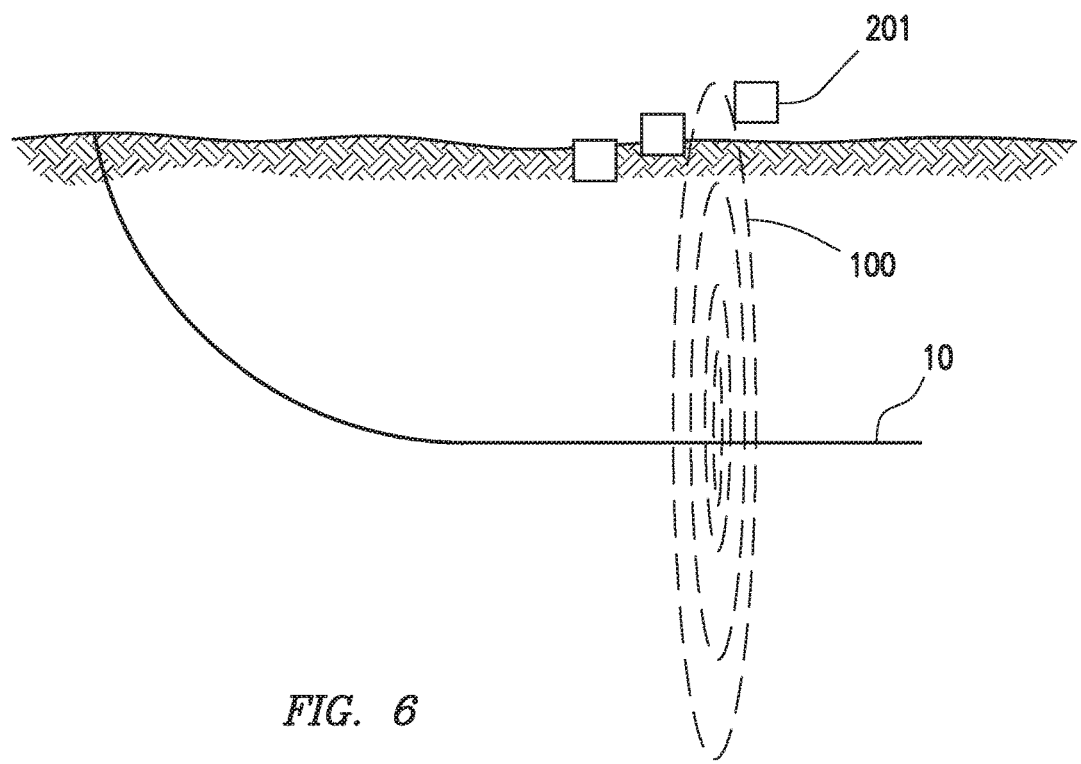
FIG. 6 is a side view of the use of a single wire guidance system with multiple surface sensors consistent with at least one embodiment of the present disclosure.

In yet another embodiment, magnetic sensors (201) may be placed on the surface to verify the horizontal position of reference wellbore (10) along its length, as shown in FIG. 6.

Figure 7:
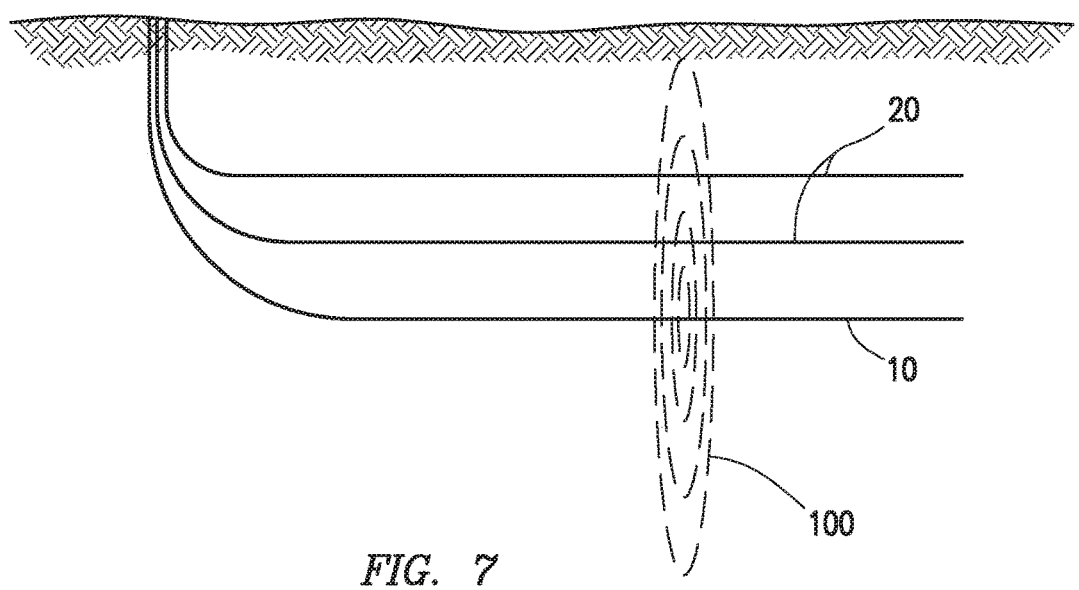
FIG. 7 is a side view of the use of a single wire guidance system with multiple adjacent horizontal well legs vertically spaced with respect to one another consistent with at least one embodiment of the present disclosure.

In another embodiment, as shown in FIG. 7, a plurality of horizontal guided wellbores (20) may be drilled, wherein each of the plurality of horizontal guided wellbores are substantially parallel, vertically aligned with respect to surface (17). Each of the plurality of horizontal guided wellbores may be ranged as described above in reference to reference wellbore (10), as may be seen in FIG. 7.

In yet another embodiment, as shown in FIG. 8, a plurality of horizontal guided wellbores (20) may be drilled that are aligned horizontally with respect to the surface of the Earth and generally parallel. Each of the plurality of horizontal guided wellbores may be ranged as described above in reference to reference wellbore (10). In an alternative embodiment, the first horizontal guided wellbore (20) may be ranged to the reference wellbore and subsequent horizontal guided wellbores (20) may be ranged to the first horizontal guided wellbore.

In another embodiment, as shown in FIG. 9, the methodology described above may be used in thermally assisted gravity drainage systems. In thermally assisted gravity drainage, a number of horizontal wells are drilled in a pattern. Thermal heating elements are later deployed in certain of the wells and pumps deployed in others. It may be desirable to have a tight grid of wells to allow effective thermal heating and drainage. FIG. 9 depicts a horizontal cross section of an array of horizontal guided wellbores (20) displaced vertically and laterally from reference wellbore (10). Each of the plurality of horizontal guided wellbores (20) may be ranged as described above in reference to reference wellbore (10).

Figure 10:
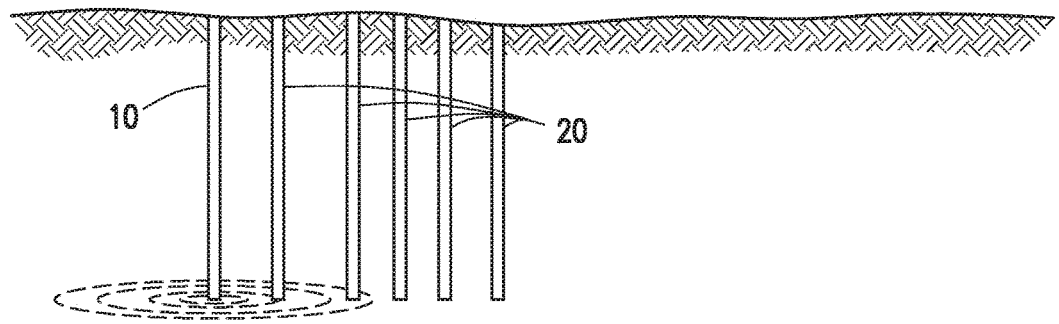
FIG. 10 is a side view of the use of a single wire guidance system in an array of vertical wells consistent with at least one embodiment of the present disclosure.

In still another embodiment, as shown in FIG. 10, the methodology described above may be used in vertical steam drive for heavy oil extraction. Reference wellbore (10) is vertical and each of a plurality of guided wellbores (20) is also vertical. Each of the plurality of vertical guided wellbores (20) may be ranged as described above in reference to reference wellbore (10).

Figure 11:
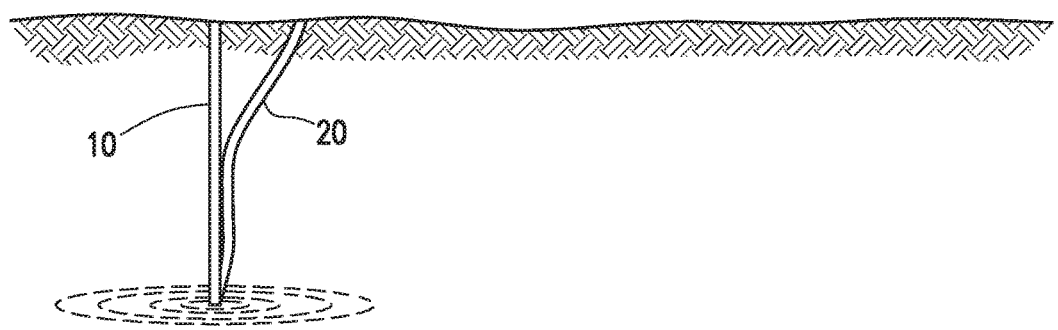
FIG. 11 is a side view of the use of a single wire guidance system in well intercept consistent with at least one embodiment of the present disclosure.

In still yet another embodiment, as shown in FIG. 11, reference wellbore (10) may be a producing well. In the event it is desirable to intercept reference wellbore (10), for example, to mitigate a pressure control event, a ranging signal from the reference wellbore (10) may be used to guide a guided wellbore (20), in this instance, a relief well on an intercept path.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A system comprising:
 a current source;
 a ground terminal, the ground terminal electrically connected to the current source, the ground terminal grounded at the surface of the Earth;
 a reference wellbore comprising an intermediate casing, the intermediate casing extending from the surface of the Earth to a horizontal section of the reference wellbore, the intermediate casing further including an intermediate casing electrical discontinuity, the intermediate casing being electrically conductive between the intermediate casing electrical discontinuity and a bottom hole end of the intermediate casing;
 a reference conductor, the reference conductor electrically connected to the current source, the reference conductor inserted into the reference wellbore;
 a tubular, the tubular including a tubular string electrical discontinuity, the tubular inserted into the reference wellbore through the intermediate casing, the tubular having a tubular bottom hole end, and the tubular being electrically conductive between the tubular string electrical discontinuity and the tubular bottom hole end;
 a first electrical connection between the tubular and the reference conductor between the tubular string electrical discontinuity and the tubular bottom hole end;
 a second electrical connection between the tubular and the reference wellbore between the tubular string electrical discontinuity and the tubular bottom hole end, whereby current flowing through the reference conductor, the tubular, and the reference wellbore produces a reference magnetic field; and
 magnetic sensors positioned to sense the reference magnetic field; and
 at least one guided wellbore that is steered in response to the sensed reference magnetic field.

2. The system of claim 1, wherein the guided wellbore and the reference wellbore are substantially parallel and the magnetic sensors are located within the guided wellbore.

3. The system of claim 1, further comprising a plurality of guided wellbores each with a horizontal section, wherein each horizontal section is aligned substantially parallel with respect to the other horizontal sections and further wherein each of the horizontal sections is vertically aligned with other horizontal sections with respect to the surface of the Earth.

4. The system of claim 1, further comprising a plurality of guided wellbores each with a horizontal section, wherein each horizontal section is aligned substantially parallel with respect to the other horizontal sections and further wherein each of the horizontal sections is arranged vertically and horizontally with respect to the reference wellbore.

5. The system of claim 1, wherein the guided wellbore intercepts the reference wellbore.

6. The system of claim 1, wherein at least one of the magnetic sensors is located at the surface of the Earth.

7. The system of claim 1, wherein at least one of the magnetic sensors is located within the guided wellbore.

8. The system of claim 1, further comprising a liner, wherein the liner is electrically and mechanically connected to the intermediate casing, the liner extending from the intermediate casing to a bottom end of the reference wellbore and the tubular being within the liner.

9. The system of claim 8, wherein the liner further includes a liner electrical discontinuity.

10. The system of claim 9, wherein the liner electrical discontinuity is a gap sub or a non-conductive joint.

11. The system of claim 10, wherein the non-conductive joint is comprised of fiberglass, PEEK, or polyethylene.

12. The system of claim 9, further comprising a tubing string, the tubing string including a tubing string non-conductive section, wherein the tubing string is within the liner and wherein the reference conductor is within the tubing string.

13. The system of claim 12, wherein the tubing string is coiled tubing.

14. The system of claim 13, wherein the reference conductor has a grounded end, the grounded end electrically coupled to the reference wellbore between the tubular string electrical discontinuity and a tubing string bottom hole end.

15. The system of claim 9, wherein the electrically conductive tubular terminates in a landing bullnose.

16. The system of claim 15, wherein the liner further comprises a terminal joint between the tubing string non-conductive section and the tubing string bottom hole end and wherein the terminal joint electrically connects the reference conductor to the electrically conductive tubular.

17. The system of claim 9, wherein the liner terminates in a liner bullnose.

18. The system of claim 17, wherein the liner bullnose further comprises a landing ramp and wherein the landing ramp comprises slots and the terminal joint comprises colleted landing fingers, the colleted landing fingers being insertable into the slots.

* * * * *